Dec. 13, 1955

L. L. LEVITT 2,726,751

TRANSFER MECHANISM

Filed Sept. 25, 1951

Inventor:
Leo L. Levitt
By Frank C. Parker
Atty.

Dec. 13, 1955
L. L. LEVITT
2,726,751
TRANSFER MECHANISM
Filed Sept. 25, 1951
2 Sheets-Sheet 2
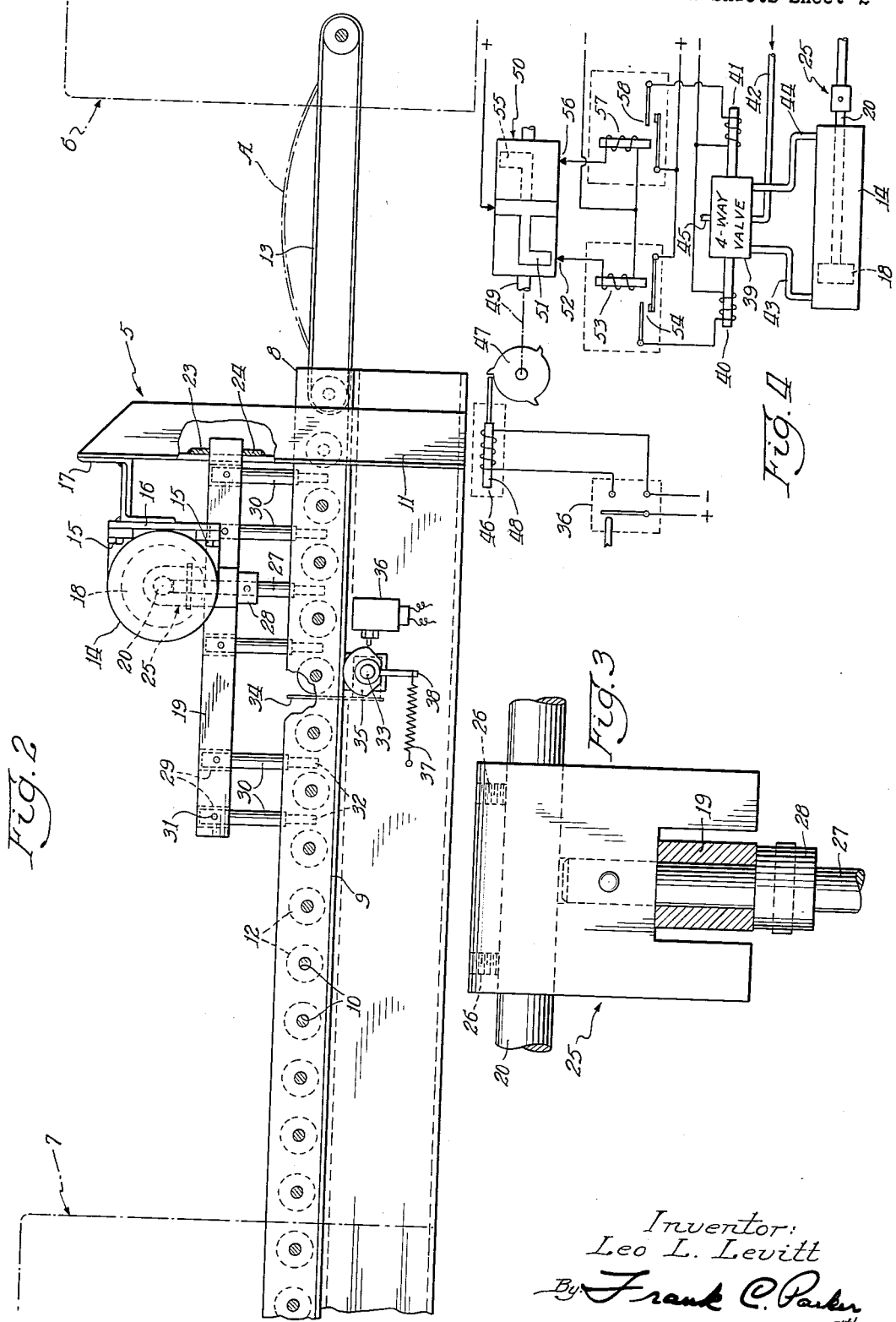
Inventor:
Leo L. Levitt
By Frank C. Parker
Atty.

United States Patent Office

2,726,751
Patented Dec. 13, 1955

2,726,751

TRANSFER MECHANISM

Leo L. Levitt, Blue Island, Ill., assignor to Borg-Warner Corporation, Chicago, Ill., a corporation of Illinois Application September 25, 1951, Serial No. 248,245

14 Claims. (Cl. 198—31)

The present invention relates generally to transfer mechanisms for transferring articles from a first zone or station to a second zone or station, and more particularly to transfer mechanisms which are adapted to be interposed between two stations, or machines, in a production line used in the manufacture of articles, such as metal earth working discs for farm machinery.

An object of the present invention is to provide a transfer mechanism which is adapted to successfully receive a series of manufactured articles in an initial order and then to rearrange, or index, the articles in a predetermined different order, or arrangement, for discharge from the transfer mechanism.

Another object of the present invention is to provide a transfer mechanism, or conveyer, which is adapted to receive articles in an initial order with a shifter assembly, or directing means, which when intermittently, or periodically, operated will rearrange, or index, into a predetermined different order, or arrangement, the articles for discharge from the transfer mechanism.

It is a purpose of the present embodiment of the invention that each of the articles, while traveling on the conveyer in its initial order, will initiate the operation of the automatic directing means for causing rearrangement of the articles.

Another goal to be accomplished by this invention is that each article, while travelling on the conveyer in its initial order, will initiate the operation of the automatic directing means for its own rearrangement. This is accomplished by reason that the article itself comes into contact with and oscillates the control means having operative connection with a means for moving the directing means in an intermittent or periodic reciprocatory manner across the conveyer, that is, transverse to the direction of travel of the articles in their initial order, to index that article into predetermined positions for travel in a row to the delivery end of the conveyer.

Further accomplishment of this invention resides in the provision of a directing means which directs, or indexes, articles while in transit on a conveyer from a single row to a plurality of parallel rows, the article of one of the parallel rows being normally in staggered relation to the articles in adjacent parallel rows.

Another goal of the invention contemplated herein is to provide a simple, inexpensive, useful and efficient mechanism for transferring articles and rearranging the same from one station in a production line to another station in that line.

For the purposes of the present disclosure, the mechanism is shown as being arranged to receive agricultural discs from a reform press in a single row, and to deliver the discs in a plurality of rows to a heat-treating furnace. It will be appreciated that the above suggested arrangement is merely by way of example and does not in any way limit the invention to such use. It is contemplated that the present transfer mechanism is adapted to be used in any type of situation where it is necessary that articles coming from one station may be transferred into a desired row or rows to be delivered to a succeeding operation.

Additional objects, aims, accomplishments and advantages of the invention contemplated herein will be apparent to persons skilled in the art after the construction and operation of the present mechanisms are understood from the description.

It is preferred to accomplish the numerous objects and purposes of the invention and to practice the same in substantially the manner hereinafter fully described and particularly pointed out in the appended claims.

This invention can be briefly described as an article transfer apparatus or conveyer for the purpose of transferring articles from one station or unit in a production line to another station or unit in a production line and consists of a plurality of driven rollers defining a table which are caused to rotate by any suitable means and which when driven will cause the articles to move transversely thereacross. The conveyer is provided with a simple, inexpensive, and efficient means for directing the articles as they come from the receiving end, or portion, of said table into a desired plurality of paths, or rows, so that articles may be thus transferred, or conveyed to the delivery end, or portion, of the table. The means for directing the articles is suitably connected to a fluid pressure responsive means, or piston, and will reciprocate the directing means transverse to the direction of travel of the articles from the receiving end, or portion, of the table. It is readily apparent that intermittent or periodic reciprocation of the fluid pressure responsive piston will cause the directing means to direct two of three articles into two different paths, or rows, and cause the directing means during the period of non-movement of the piston to allow a third article to continue uninterrupted in its path of travel as hereinbefore stated, thus making three rows of discs.

Having thus briefly described my invention, reference is now made to the accompanying drawings which form part of this specification, wherein:

Fig. 2 is a side elevation, partially broken away, of the mechanism shown in Fig. 1;

Fig. 3 is an enlarged detailed and partial showing of the directing bar, its coupling to the piston rod and the connection of one of its pins;

Fig. 4 is a diagrammatic and schematic illustration of the details of the electrical and fluid circuit for controlling the operation of the mechanism.

Figure 1:
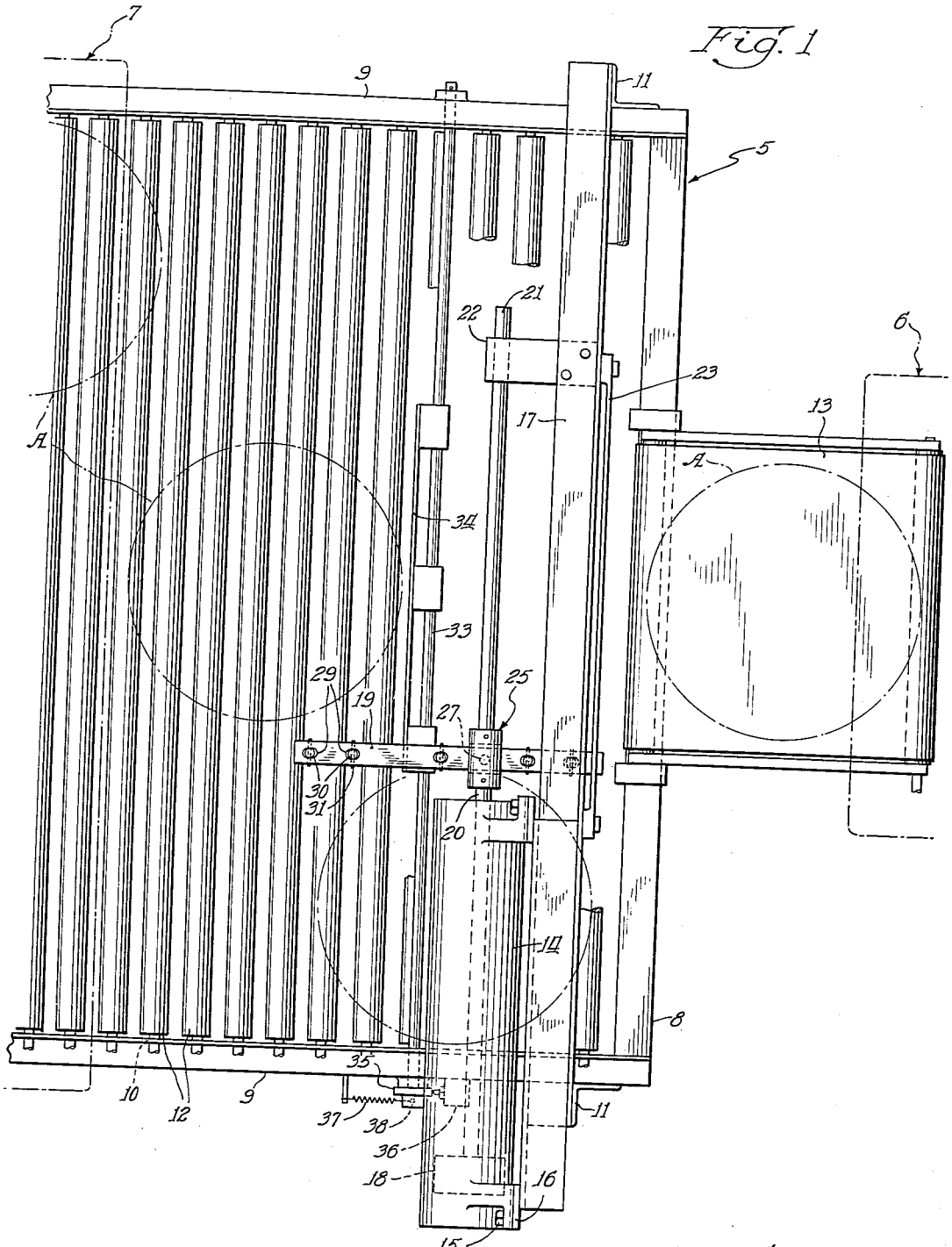
Fig. 1 is a top plan view, partially broken away, of the transfer mechanism embodying the present invention.

With advertence to Figs. 1 and 2 of the drawings, the transfer mechanism, generally indicated by reference numeral 5, is located between a reform press schematically shown at 6 and a heat-treating furnace schematically shown at 7 so that articles of manufacture, such as earth working discs A, may be transferred or conveyed from the press to the furnace.

The conveyer or transfer mechanism has a support 8 having substantially horizontally disposed members 9 with apertures 10 defined therein and legs 11 (one of which is shown in Fig. 2). Rotatably journalled in the aperture of the horizontal members are a plurality of axially parallel rollers 12, each rotatable about its own axis, to define a substantially horizontal table on which articles are received from a belt conveyor 13 of the press 6 to be transported or conveyed to the furnace 7. It is contemplated that the rollers 12 will be driven in any conventional manner (not shown).

Above the table and in spaced relation thereto is a fluid or air pressure responsive means having an air cylinder 14 fixedly mounted by bolts 15 to a plate 16 suitably welded or otherwise fixed to a member 17 on upper extensions of the support legs 11. Slidably journalled within said cylinder 14 is a piston 18 reciprocably movable therein in response to air pressure fed into said cylinder 14, the piston 18 being connected to a directing bar 19 by a piston rod 20. Because of the long stroke of the piston and for sturdy construction of the mechanism, said piston rod 20 is suitably extended, as at 21, and slidably journalled by a coupling 22 to the member 17 suitably welded or otherwise attached to the extensions of the support legs 11. It is also to be noted that the directing bar 19 is slidably connected between two parallel plates or tracks 23 and 24 affixed to the extensions of the support legs. As can be seen in Fig. 1, the directing bar 19 is free to reciprocate substantially transversely across the table parallel to the axis of the rollers 12 and is coupled or connected to the piston rod 20 by a coupling or clamp 25 brought in clamping relation therewith by set screws 26 threaded thereto, as can be seen clearly in the detailed drawing in Fig. 3. The directing bar 19 is allowed to pivot about a pin or finger 27 having a collar 28 within a restricted area on the coupling.

The directing bar has a plurality of non-circular apertures 29 in which a plurality of pins or fingers 30 are loosely pivoted for freedom of movement and ease of replacement by pivot pins 31. As will be apparent to anyone skilled in the art, in case of wear, the pins or fingers 30 are easily replaced by merely removing the pivot pins 31, dropping the pins 30 and readily replacing the same with new ones.

The pins or fingers 30 and pin or finger 27 have a reduced portion or end 32 which extends a suitable distance into spaces between the rollers and has for its purpose the maintenance of a proper space relationship with the rollers during operation.

A trip, or control mechanism having a shaft 33 is pivotally journalled to the underside of the horizontal members 9 of the support (as viewed in Fig. 2) with a plate 34 affixed thereto, which extends between the rollers and into the space above, whereby it may be contacted and thus forced to oscillate, or to be actuated, by articles coming from the receiving end of the table. The shaft 33 has a cam 35 affixed to oscillate therewith, and to actuate the normally open limit switch means 36. Thus it can be seen that the plate 34, when actuated by an article, causes the shaft to rotate the cam 35 to trip the limit switch 36, and after the article has lost contact with the plate, i. e., after the article has been directed to the new position by action of the directing means, a bias spring 37 attached through pin 38 to the shaft will cause the cam, shaft and plate to return to their initial positions, thus again opening the limit switch means 36, having electrical connections to a four-way solenoid valve of the fluid pressure responsive means, the operation of which will be apparent in the detailed explanation of Fig. 4 herein below.

Fig. 4 shows a four-way self-positioning valve means 39 having solenoids 40 and 41 and conduit 42. When one of said valve solenoids 40 or 41 is energized, fluid under pressure from the conduit 42 is caused to be fed through one of a pair of conduits 43 or 44 to the cylinder 14 to move or reciprocate the piston 18 and simultaneously fluid is bled through the other of the two conduits 43 or 44 to an exhaust conduit 45.

When the limit switch means 36 is closed a circuit from a suitable source of supply is completed to energize the ratchet relay solenoid 46 thus causing a three-position ratchet relay cam 47 to be moved a third of a revolution by the operation of a plunger or armature 48. The ratchet relay cam 47 is operatively connected by a shaft 49 to a three-position sequence switch means 50. When this three-position sequence switch 50 is in the first of its positions its associated contacts 51 and 52 are closed, thus completing a circuit for the energization of a solenoid 53 which in turn closes the contacts of a switch 54 to energize the solenoid 40. When the three-position sequence switch 50 is in a second of its positions, it is in a neutral or no-contact position and neither of the four-way valve solenoids 40 or 41 is energized. It is to be understood that the four-way solenoid valve 39 is a self-positioning type and will remain in its respective position until actuated, whether or not one of its solenoids is continuously energized, this latter feature being necessary since the repositioning of the sequence switch 50 breaks the circuit of its associated contacts. And finally when the ratchet relay cam 47 causes the sequence switch 50 to reach the third of its positions, its associated contacts 55 and 56 are closed, thus completing a circuit for energizing a solenoid 57 which in turn closes the contacts of a switch 58 to energize the solenoid 41. It is readily apparent that the disclosure herein of the sequence switch is merely schematic, the neutral position being accomplished by merely spacing the contacts on a revolving drum and other arrangements could be made such as cam-operated contacts, one being left unconnected.

A representative sequence of operation is now explained with reference to Figs. 1, 2 and 4. When an article comes from the belt 13 of the press 6 onto the table it contacts or oscillates the plate 34 thereby effecting closure of the limit switch 36 through operation of the cam 35. The closure of this switch 36 energizes the solenoid 46, causing armature 48 to move the ratchet relay cam 47 thus ultimately energizing the solenoid 40 and fluid from the supply line 42 is direct by the four-way solenoid valve 39 through the conduit 43 to move the piston 18 to the right as viewed in Fig. 4 and simultaneously fluid is caused to be bled or exhausted from cylinder 14 through conduit 44 out through the exhaust conduit 45. It can be seen that the directing bar 19 is moved transversely across the table as viewed in Fig. 1 and the article which started the sequence is moved therewith to a position wherein it will move in a path to the delivery end of the table. When a second article comes from the belt 13 and onto the table it actuates or oscillates the plate 34 to close the limit switch 36 through operation of cam 35 which ultimately causes the sequence switch 50 to move to its second or neutral position by energization of ratchet relay solenoid 46 and operation of cam 47.

Since the neutral position does not energize the four-way solenoid valve, the article is allowed to move uninterrupted to the delivery end of the table thus constituting a second path on the conveyor table. When a third article comes from the belt 13 and actuates or oscillates the plate 34, the limit switch 36 is again closed through operation of the cam 35 to cause the sequence switch 50 to be moved to its third position by means of the ratchet relay system. In this position the solenoid 41 is ultimately energized to cause fluid from the conduit 42 to be fed through the conduit 44 to move the piston 18 to the left as viewed in Fig. 4, and simultaneously cause fluid to be exhausted or bled through conduit 43 to the exhaust conduit 45. Thus the directing bar 19 will be caused to move transversely across the table in a direction opposite from its travel with the first article as viewed in Fig. 1 to move the article therewith to a position wherein it starts to move a third path to the delivery end of the table or conveyer. It is readily apparent that the system could be arranged to operate in any desired sequence, the one described herein being a typical sequence.

While this invention has been described in detail in its preferred form or embodiment, it will be apparent to persons skilled in the art, after understanding the improvements, that various changes and modifications may be made therein without departing from the spirit or scope thereof. It is aimed in the appended claims to cover all such changes and modifications.

I claim:

1. An article transfer apparatus comprising; means including roller conveyer means on which articles are transferred from a receiving portion to a delivery portion; directing means arranged in spaced relation to said conveyer means for reciprocal movement transverse to the direction of travel of the articles to the delivery portion and comprising a bar spaced from said conveyer means and having a plurality of pins, pivotally fixed thereto, extending into spaces between said rollers; and automatically operable control means operatively connected to the conveyer means for controlling and operating said directing means and comprising, an oscillatable means actuated by contact with said articles, and means responsive to actuation of said oscillatable means for effecting periodic reciprocation of said directing means, whereby said articles are directed into a plurality of paths for travel towards the delivery portion of said conveyer means.

2. An article transfer apparatus comprising; means including conveyer means on which articles are transferred from a receiving portion to a delivery portion; directing means arranged in spaced relation to said conveyer means for reciprocal movement transverse to the direction of travel of the articles to the delivery portion; and automatically operable control means operatively connected to the conveyer means for controlling and operating said directing means and comprising, an oscillatable means actuated by contact with said articles and including an oscillatable plate, a shaft attached to said plate, and a cam mounted on said shaft for oscillatory movement therewith when said plate is contacted, and means responsive to actuation of said oscillatable means for effecting periodic reciprocation of said directing means, whereby said articles are directed into a plurality of paths for travel towards the delivery portion of said conveyer means.

3. An article transfer apparatus comprising: means including conveyer means on which articles are transferred from a receiving portion to a delivery portion; directing means arranged in spaced relation to said conveyer for reciprocal movement transverse to the direction of travel of the articles to the delivery portion; and automatically operable control means operatively connected to said conveyer means for operating said directing means and comprising an oscillatable means actuated by contact with said articles, and means responsive to actuation of said oscillatable means for effecting periodic reciprocation of said directing means and including a fluid pressure responsive means attached to said directing means, whereby said articles are directed into a plurality of paths for travel towards the delivery portion of said conveyer means.

4. An article transfer apparatus comprising: means including conveyer means on which articles are transferred from a receiving portion to a delivery portion and including a table defined by a plurality of driven rollers arranged side by side in a common plane; directing means arranged in spaced relation to said conveyer for reciprocal movement transverse to the direction of travel of said articles to the delivery portion and including a bar having a plurality of pins, pivotally fixed thereto, extending into spaces between said rollers; and automatically operable control means actuated by contact with said articles and including an oscillatable plate extending through the table defined by said rollers, a shaft attached to said plate, and a cam mounted on said shaft for oscillatory movement therewith when said plate is contacted; and means responsive to actuation of said oscillatable means for effecting periodic reciprocation of said directing means and including a fluid pressure responsive means attached to said directing means whereby said articles are divided into a plurality of paths for travel towards the delivery portion of said conveyer means.

5. An article transfer apparatus comprising: means including conveyer means on which articles are transferred from a receiving portion to a delivery portion and including a table defined by a plurality of driven rollers arranged side by side in a common plane; directing means arranged in spaced relation to said conveyer for reciprocal movement transverse to the direction of travel of said articles to the delivery portion and including a bar having a plurality of pins, pivotally fixed thereto, extending into spaces between said rollers; an automatically operable control means actuated by contact with said articles and including an oscillatable plate extending through the table defined by said rollers, a shaft attached to said plate, and a cam mounted on said shaft for oscillatory movement therewith when said plate is contacted; and means responsive to actuation of said oscillatable means for effecting periodic reciprocation of said directing means and including a fluid pressure responsive means, a valve means connected to said fluid pressure responsive means for feeding fluid pressure from a source of fluid pressure periodically into the pressure responsive means, and an electrical switch means connected to said valve means and operated in response to said oscillatable cam, whereby said articles are directed into a plurality of paths for travel towards delivery portion of said conveyer means.

6. In an article transfer apparatus adapted to transfer and rearrange articles which are relatively flat, relatively wide comprising a plurality of driven rollers arranged in side by side relation in a common plane so that articles are transferred thereon from a receiving end to a delivery end thereon; the combination of means for directing said articles into a plurality of paths while traveling to the delivery end and comprising: directing means mounted in spaced relation to said rollers and extending into the spaces between said rollers; drive means connected to said directing means for periodic reciprocation of said directing means in a direction transverse to the direction of travel of said articles; and automatically operable control means connected to said drive means and actuated by said articles for causing said drive means to reciprocate said directing means.

7. An article transfer apparatus comprising a plurality of driven rollers arranged in side by side relation in a common plane so that articles are transferred thereon from a receiving end to a delivery end; the combination of means for directing said articles into a plurality of paths while traveling to the delivery end and comprising; directing means mounted in spaced relation to said rollers and including a bar, a plurality of pins pivotally mounted on said bar and extending into spaces between said rollers; drive means connected to said directing means for periodic reciprocation of said directing means in a direction transverse to the direction of travel of said articles; and automatically operable control means connected to said drive means and actuated by said articles for causing said drive means to reciprocate said directing means.

8. In an article transfer apparatus adapted to index articles which are relatively flat, relatively wide comprising a plurality of driven rollers arranged in side by side relation in a common plane so that articles are transferred from a receiving end to a delivery end; the combination of means for directing said articles into a plurality of paths while traveling to the delivery end and comprising: directing means mounted in spaced relation to said rollers and extending into the spaces between said rollers; drive means including a fluid pressure responsive means connected to said directing means for periodic reciprocation of said directing means; and automatically operable control means connected to said drive means and actuated by said articles for causing said drive means to reciprocate said directing means.

9. In an article transfer apparatus comprising a plurality of driven rollers arranged in side by side relation in a common plane so that articles are transferred from a receiving end to a delivery end; the combination of means for directing said articles into a plurality of paths while traveling to the delivery end and comprising; directing means mounted in spaced relation to said rollers; drive means connected to said directing means for periodic reciprocation of said directing means in a direction transverse to the direction of travel of said articles; and automatically operable control means connected to said drive means and including a trip mechanism comprising a plate extending through the plane of said rollers, a shaft attached to said plate, a cam mounted on said shaft, and means responsive to actuation of said mechanism for causing said drive means to reciprocate said directing means.

10. In an article transfer apparatus comprising a plurality of driven rollers arranged in side by side relation in a common plane so that articles are transferred from a receiving end to a delivery end; the combination of means for directing said articles to a plurality of paths while traveling to the delivery end and comprising; directing means mounted in spaced relation to said rollers; drive means connected to said directing means for periodic reciprocation of said directing means; and automatically operable control means connected to said drive means and including, a trip mechanism comprising, a plate extending through the plane of said rollers, a shaft attached to said plate, and a cam mounted on said shaft, and means responsive to actuation of said trip mechanism by said articles coming from the receiving end thereof and connected to said drive means for causing the same to periodically reciprocate said drive means thus directing said articles to a plurality of paths, and comprising switch means in operative connection with said cam, and valve means operatively connected to said switch means and to said drive means whereby the valve means is actuated by said switch means when the latter is actuated by said cam.

11. In an article transfer apparatus comprising a plurality of driven rollers arranged in side by side relation in a common plane so that articles are transferred from a receiving end to a delivery end; the combination of a means for directing said articles into a plurality of paths while traveling to the delivery end and comprising; directing means mounted in spaced relation to said rollers and including a bar, a plurality of pins pivotally mounted on said bar and extending into spaces between said rollers; drive means including a fluid pressure responsive means connected to said directing means for periodic reciprocation of said directing means in a direction transverse to the direction of travel of said articles; and automatically operable control means connected to said drive means and including, a trip mechanism comprising, a plate extending through the plane of said rollers, a shaft attached to said plate, and a cam mounted on said shaft, and means responsive to actuation of said trip mechanism by said articles coming from the receiving end thereof and connected to said drive means for causing the same to periodically reciprocate said drive means thus directing said articles into a plurality of paths and including a switch means in operative connection with said cam, and a valve means operatively connected to said switch and to said drive means whereby the valve means when actuated by said switch means causes fluid pressure to be fed into said fluid pressure responsive means.

12. An article transfer apparatus comprising means including a conveyor upon which articles are transferred from a receiving portion to a delivery portion; directing means for rearranging the articles on said conveyor from an initial order to a final order; and means for automatically operating the rearranging means; said last-mentioned means including a trip mechanism comprising a plate extending through the plane of said conveyor means, a shaft attached to said plate, and a cam mounted on said shaft, and means responsive to actuation of said trip mechanism by said articles coming from the receiving portion of said conveyor and connected to said rearranging means for causing the same to rearrange said articles, and including switch means in operative connection with said cam, and a valve means operatively connected to said switch means and to said rearranging means whereby the valve means is actuated by said switch means when the latter is actuated by said cam.

13. An apparatus for transferring relatively flat, relatively wide articles comprising; means including a conveyor means on which said articles are transferred from a receiving portion to a delivery portion; directing means for rearranging said relatively flat, relatively wide articles from an initial to a final order comprising a bar spaced from said conveyor means and having a plurality of pins pivotally fixed thereto, extending into the plane of said conveyor, said directing means acting continually in one plane with a backward and forward stroke transverse to the direction of travel of said articles, said directing means further acting to rearrange said articles on their travel from the receiving portion to the delivery portion on both the forward and the backward strokes, and an automatically operable control means operatively connected to said conveyor for controlling and operating said directing means.

14. An apparatus for transferring relatively flat, relatively wide articles comprising; means including a conveyor means on which said articles are transferred from a receiving portion to a delivery portion; directing means for rearranging said relatively flat, relatively wide articles from an initial to a final order comprising a bar spaced from said conveyor means and having a plurality of pins pivotally fixed thereto, extending into the plane of said conveyor; an automatically operable control means operatively connected to said conveyor for controlling and operating said directing means, and comprising an oscillatable means actuated by contact with said articles coming from the receiving portion of the conveyor means, and means responsive to actuation of said oscillatable means for effecting periodic reciprocation of said directing means whereby said relatively flat, relatively wide articles are directed into a plurality of paths for travel toward the delivery portion of said conveyor means.

References Cited in the file of this patent

UNITED STATES PATENTS

| Number | Name | Date |
| --- | --- | --- |
| 1,102,832 | Wetmore | July 7, 1914 |
| 1,132,586 | Johnson | Mar. 23, 1915 |
| 1,240,834 | Fischer | Sept. 25, 1917 |
| 1,871,832 | Absmeier | Aug. 16, 1932 |
| 1,906,249 | Crowley | May 2, 1933 |
| 2,020,552 | Hills | Nov. 12, 1935 |
| 2,612,984 | Alden | Oct. 7, 1952 |

FOREIGN PATENTS

| Number | Country | Date |
| --- | --- | --- |
| 818,058 | France | Sept. 17, 1937 |